United States Patent [19]

Bevilacqua

[11] 3,847,736

[45] Nov. 12, 1974

[54] FLOW TWISTER FOR A NUCLEAR REACTOR

[75] Inventor: Frank Bevilacqua, Windsor, Conn.

[73] Assignee: Combustion Engineering, Inc., Windsor, Conn.

[22] Filed: Jan. 24, 1972

[21] Appl. No.: 220,213

[52] U.S. Cl. .................................. 176/78, 176/76
[51] Int. Cl. ............................................ G21c 3/34
[58] Field of Search ............ 176/73, 74, 75, 76, 78, 176/81

[56] References Cited
UNITED STATES PATENTS

| | | |
|---|---|---|
| 3,344,855 | 10/1967 | Clark .................................... 176/81 |
| 3,379,619 | 4/1968 | Andrews et al. ....................... 176/76 |
| 3,395,077 | 7/1968 | Long Sun Tong et al. ......... 176/81 X |
| 3,423,287 | 1/1969 | Anthony et al. ....................... 176/78 |
| 3,510,397 | 5/1970 | Zettervall............................. 176/76 |
| 3,629,065 | 12/1971 | Knox..................................... 176/81 |
| 3,663,367 | 5/1972 | Calvin.................................. 176/78 |

FOREIGN PATENTS OR APPLICATIONS

| | | | |
|---|---|---|---|
| 874,039 | 8/1961 | Great Britain ......................... 176/73 |
| 1,514,558 | 6/1969 | Germany .............................. 176/78 |
| 2,106,342 | 10/1971 | Germany .............................. 176/78 |

Primary Examiner—Leland A. Sebastian
Assistant Examiner—Roger S. Gaither
Attorney, Agent, or Firm—Harris G. Luther

[57] ABSTRACT

A flow twister for coolant fluid flowing longitudinally in channels between spaced parallel nuclear reactor fuel rods positioned laterally by a grid of intersecting grid members extending transversely of and between said rods. The twister is a twisted metallic tab of cruciform cross section positioned at a grid intersection and located in and extending longitudinally of a channel an having one end secured to a grid and the other end free.

9 Claims, 10 Drawing Figures

PATENTED NOV 12 1974

FLOW TWISTER FOR A NUCLEAR REACTOR

BACKGROUND OF THE INVENTION

The fuel or fissionable material for nuclear reactors is conventionally in the form of fuel elements or rods which are in turn grouped together in the reactors in bundles comprising fuel element assemblies. An elongated support means usually comprising an upper member, a lower member and longitudinally extending members or separators connecting the two members, in the fuel assembly is provided to vertically support the fuel elements or rods in substantially parallel relation. A plurality of longitudinally spaced grids extend across the assembly and are secured to the longitudinally extending members of the elongated support means to vertically position the spaced grids in the assembly. The fuel rods, in turn, extend in a parallel array through openings in the grids and are vertically supported by the bottom end member of the support means. Each grid has means for laterally positioning the fuel rods. Each reactor has a number of such fuel element assemblies therein, comprising the reactor core. The liquid moderator-coolant, usually water, flows upwardly through the reactor core in the channels or longitudinal passageways between the fuel elements to remove heat. Reference may be made to U.S. Pat. No. 3,379,619 for a more detailed showing of a typical well-known assembly.

One of the operating limitations on current reactors is established by the onset of film boiling on the surfaces of the fuel elements. This phenomena is commonly described qualitatively as departure from nucleate boiling (DNB) and quantitatively in terms of the amount of heat flux existing when DNB occurs (critical heat flux or CHF). This condition is affected by the fuel element spacing, the system pressure, the heat flux, the coolant enthalpy and the coolant velocity. When DNB occurs, there is a rapid rise in the temperature of the clad of the affected fuel element due to the reduced heat transfer which could result in a failure of the fuel element clad. Therefore, in order to maintain a factor of safety, the reactor must be operated a certain margin below the CHF and the point at which DNB occurs. This margin is referred to as the thermal margin.

Nuclear reactors normally have regions in the core which have a higher neutron flux and power density than other regions. In these regions of high power density there is a higher rate of coolant enthalpy rise than in other regions. It is such regions that set the maximum operating condition for the reactor and limit the amount of power that can be generated since it is in these regions that the critical heat flux would be reached first.

In order to provide more efficient contact of the coolant with the fuel rods and uniformly mix the coolant throughout the assembly, attempts have been made to produce a transverse or twisting motion of the coolant flow in the assembly of fuel rods. Such an attempt is shown in the abovementioned U.S. Pat. No. 3,379,619 and in the U.S. Pat. to Guala No. 2,693,942 issued Nov. 9, 1954 and the patent to Clark U.S. Pat. No. 3,344,855 issued Oct. 3, 1967 and in the patent to Long Sun Tong U.S. Pat. No. 3,395,077 issued July 30, 1968.

SUMMARY OF THE INVENTION

The present invention relates to a fuel assembly for a nuclear reactor and more particularly to the spacing and positioning grid for the fuel rods of the assembly and to a flow twister mounted on the grid at the intersection of the grid cross members. The grid comprises intersecting cross members of ribbon-like strips arranged on edge in the cooling fluid flow through the assembly with a twisted tab of cruciform cross section extending longitudinally of the cooling fluid flow and having one end supported on a grid, with the other end free.

It has been found that coolant flow inclined to the fuel elements and fuel flow circulating around the fuel elements will result in a higher value for the critical heat flux probably because such flow inhibits the formation of steam bubbles and superheated water layers or voids which are found to exist over the fuel element surface just prior to DNB in the presence of parallel flow. It has also been found that mixing vanes or flow deflectors or flow twisters placed in the coolant flow channels of a reactor core will mix coolant from various channels and thus tend to reduce the effect of hot channels. The mixing lowers the high coolant enthalpy rise in the hot channels and tends to average out the enthalpy rise over the entire core cross section. Both effects mean that the reactor can be operated at a higher power level and still maintain a safe thermal margin.

An object of the invention is a simple strong rigid flow twister for a nuclear reactor.

A further object of this invention is to provide novel means for producing a spiral motion of the coolant flow.

A still further object of this invention is to provide a new and improved fuel assembly for producing a spiral and outward flow of cooling fluid to improve the cooling efficiency and induce mixing of the coolant.

The objects of the invention are accomplished by providing a coolant flow twister in one or more of the spaces between adjacent fuel elements. The twister is generally of a spiral shape and supported so that flow will be diverted from the centers of the flow channels toward and circulated around adjacent fuel elements. The twisters are supported at the intersections of the strips of a grid which may also serve as a support grid for the fuel element. The twisters extend outward from the grid intersection longitudinally of the cooling fluid flow stream, generally parallel to the fuel rods and are secured at one end to the grid strips and free at the other end. The cruciform shape of the cross section serves to provide additional fluid directing surfaces and give the twister the strength and rigidity necessary to hold the twister in position and prevent sideways movement and vibration.

These and other objects and advantages of the present invention will become apparent when considered in view of the following detailed description and annexed drawings.

DESCRIPTION OF THE PREFERRED EMBODIMENT

Figure 1:
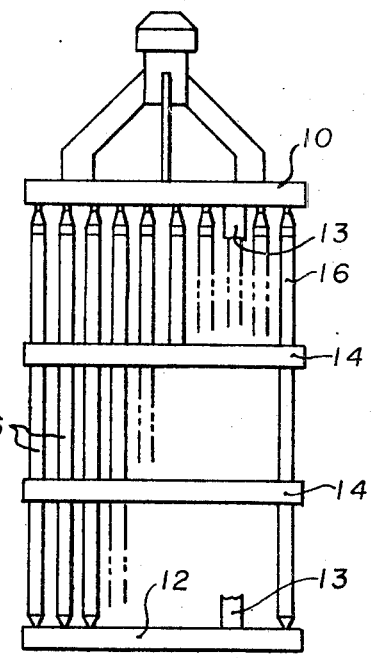
FIG. 1 is an elevation of a fuel assembly including grids on which the twisters incorporating the present invention are mounted.

A nuclear fuel assembly may comprise an upper end fitting 10 connected with a lower end fitting 12 by elongated supports or thimbles 13. Between the two fittings may be a plurality of spaced spacer grids 14 which may be secured to the supports or thimbles to hold them in position. Each grid may be connected to a narrow enclosing band 38 which in turn may be connected to the thimble 13 or the grids may be otherwise connected to the thimbles 13 as by welding directly to the supports to hold the grids in spaced relation along the fuel rods. Fuel rods 16 may be inserted through the upper fitting and through openings in the grid and down onto the lower end fitting which supports them. The spaced fuel rods 16 define channels 24 between the rods through which a cooling fluid, which may be water and may be pressurized, is forced generally upward along the rods. The core of a nuclear reactor is formed from a plurality of such fuel assemblies and it is in such assemblies that the coolant flow deflectors and twisters of the present invention are incorporated. The reactor coolant flows up through apertures in the lower end fitting 12 and upwardly through the grids 14 and channels 24, along the elongated fuel elements 16 and out through the upper end fitting 10. The grid strips 18 and 20 intersect at 30 in the coolant flow channels 24 and the coolant flow unless disturbed will be generally parallel to the elongated fuel rod. It is this upward parallel coolant flow through the fuel assemblies which is disturbed and deflected and twisted in this invention.

Figure 3:
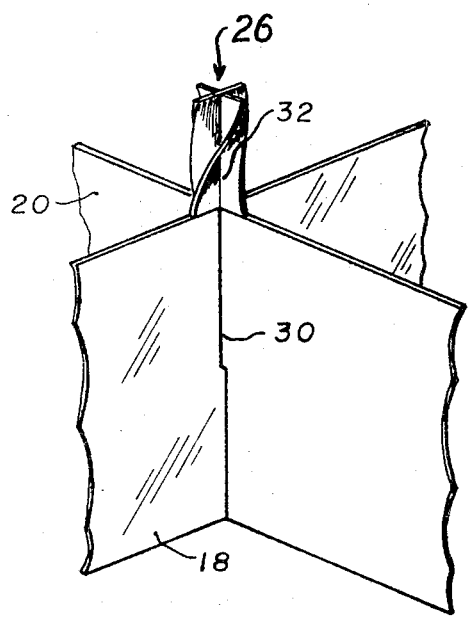
FIG. 3 is a perspective view of a portion of a grid showing the grid intersection and a twister mounted on the grid at the intersection.
Figure 5:
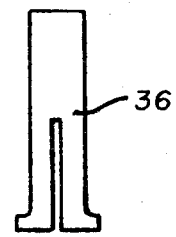
FIGS. 4 and 5 show the separate elements of the twister.
Figure 4:
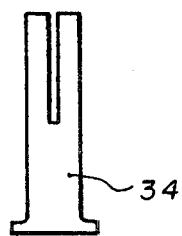
Figure 7:
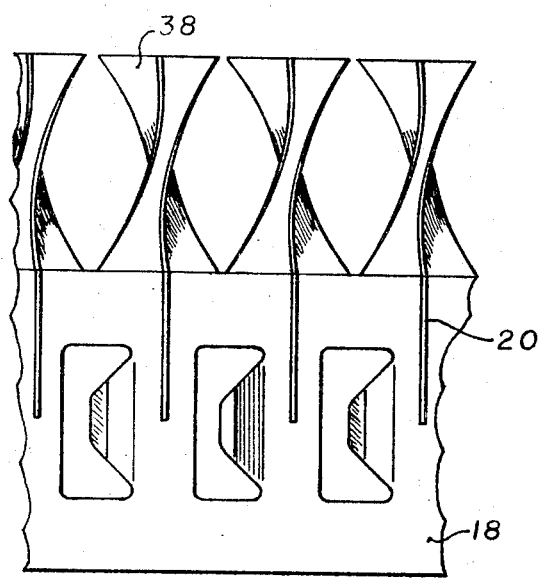
FIG. 7 is an elevation of FIG. 6.
Figure 8:
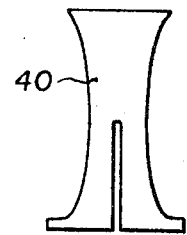
FIGS. 8 and 9 show the elements of the twister of FIG. 6.
Figure 9:
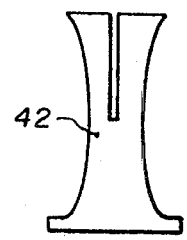

The coolant flow deflectors and twisters may be mounted on the spacer grids 14 preferably at the intersection 30 defined by intersection of the strips 18 and 20. The spacer grids are located at intervals along the length of the fuel assembly as shown in FIG. 1. These grids may be for the sole purpose of supporting the twisters as shown in FIG. 3 or they may be for the additional purpose of spacing and holding the fuel elements.

Figure 2:
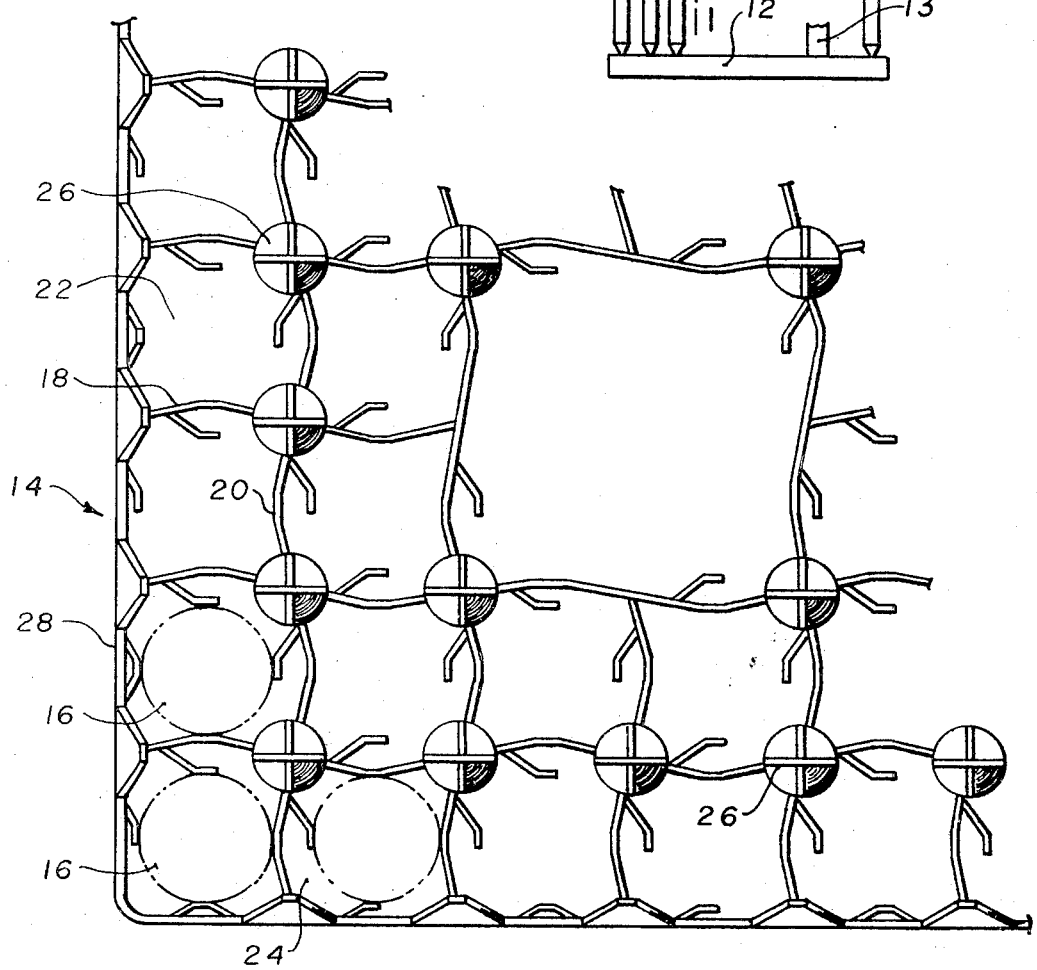
FIG. 2 is a plan view of a grid incorporating the present invention.
Figure 10:
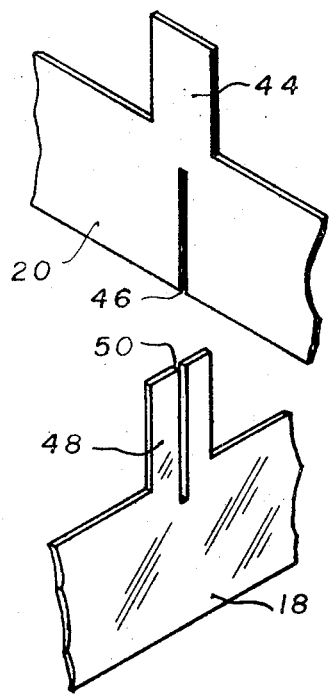
FIG. 10 is a perspective view of a portion of a grid showing the twister elements integral with the grid.

FIG. 2 illustrates fuel rods 16 located in or passing through openings 22 in the grid 14 formed of intersecting grid strips 18 and 20. These grid strips 18 and 20 intersect at approximately the center of a channel, indicated generally at 24, having an axis parallel to the fuel rods 16 and defined by the four surrounding fuel rods 16. The flow twisters 26 are mounted on the grid strips 10 at the intersections 30 of the strips.

As shown in FIGS. 1 and 2, the grid strips 18 and 20 may be generally straight thin intersecting metal strips of substantial width positioned on edge and may be secured together in any suitable manner and are preferably intermeshed in the manner used in the egg separators in an egg crate in which all strips running in one direction are slotted downwardly from the upper edge about half their width to receive the strips running in the other direction and the strips running in that other direction are slotted upwardly from the bottom about half their width to receive the strips running in the one direction. Such a structure will provide a grid of intersecting and interengaging grid strips. The grid strip 18 may thus be assembled with the grid strip 20 by pushing the slots in the grid strip 20 downwardly through the slots in the grid strip 18 and over the solid portion of strip 18. The grid strips may be unslotted and secured together by welding if desired.

The twister 26 is of cruciform cross section having arms to whose longitudinal surfaces substantially extend along the longitudinal length of the twister provide the strength and rigidity necessary to hold the twister in position and hold it against transverse movement or vibration. One end of the twister matches arms is attached to the grid in any suitable manner, as by welding to or being made integral with the grid, preferably at the intersection of the grid strips and the twister extends outwardly from the grid, preferably downstream from the grid and in the cooling fluid flow passage. The other end of the twister is free. The twister is a tab of cruciform cross section having arms aligned with and matching the grid cross members at the intersection 30 and spiraling along and around its longitudinal centerline or central axis 32 to provide a spiral guide to direct the cooling fluid, such as pressurized water, to flow in a spiral path. The degree of twist may be any desired amount from a few degrees to more than 360° depending on the pressure drop permitted, the number of twisting surfaces and the amount of rotation desired. In the design now preferred the tab or twister will extend about one inch outward from the grid and will have a twist of about 90°.

The tabs may be built up of interengaging or welded twisted strips 34 and 36 to form the cruciform section or may be a solid piece such as an extruded strip of the desired cross section, such as a cross, twisted as a unit to give the desired spiral form.

In FIGS. 2 and 3 the twisters 26 are shown as made from straight sided tabs such as 34 and 36 which are assembled by intermeshing the two tab parts 34 and 36, then welding one end of the assembled members to the separate cross members at an intersection 30 and then twisting the assembled tab members about the centerline 32 to form the helical twister with the flow directing surfaces or arms extending radially outward from the centerline 32 and spiraling around and along the centerline 32 aligned with the intersection.

As shown in FIGS. 6, 7, 8 and 9, the twisters 38 may be scalloped or contoured to conform to the shape of adjacent fuel rods and are made up of tab strips 40 and 42 assembled and formed in a manner similar to twisters 26

Figure 6:
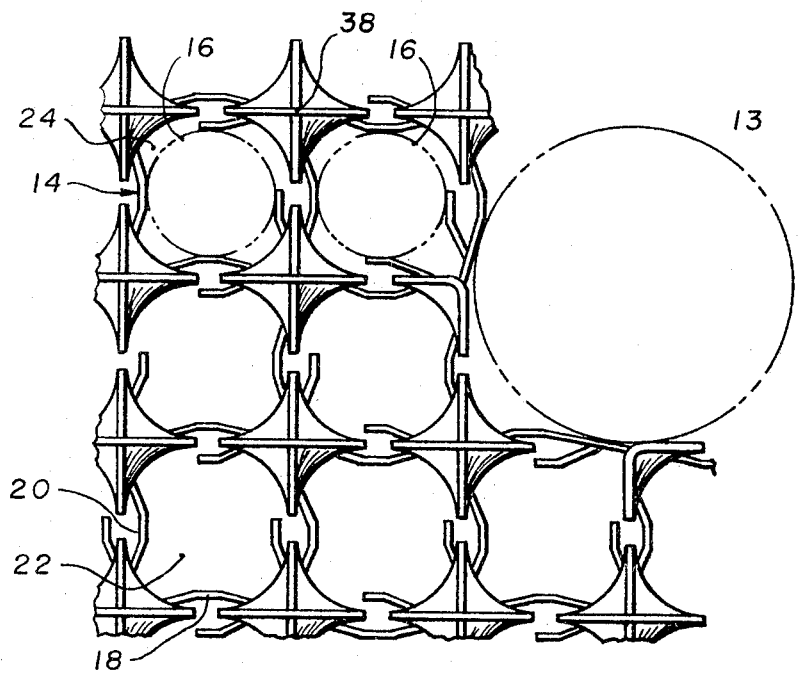
FIG. 6 is a plan view of a grid with a twister contoured to conform to the shape of a fuel rod.

If desired the tabs for the twister may be formed integral with the grid strips. In such a case one grid strip say 20 with the integral tab 44 portion extending outwardly therefrom would be slotted at 46 from the bottom to receive the grid strip 18. The grid strip 18 with the integral tab portion 48 extending outwardly would be slotted at 50 from the top of the tab 48 downwardly to receive the grid strip 20. The tab portions 46 and 48 would be welded together after the grid strips 18 and 20 are assembled and the assembled tab then twisted to form a structure such as shown in FIGS. 2 and 6.

The twister in the coolant passage causes the coolant fluid flowing past the twister to rotate and flow in a spiral path around the channel axis thus mixing the coolant in adjacent channels and causing the more dense water to be thrown toward the fuel rods due to centrifugal action.

If the twisters are all twisted in the same direction each twister will assist the others around any single fuel rod in urging the denser fluid, centrifugally thrown toward the fuel rods, in an upward spiral around that fuel rod thus increasing the cooling efficiency of the fluid.

It will be understood that the grids and twisters shown and described herein are merely illustrative and that changes may be made without departing from the scope of the invention as claimed.

What is claimed is:

1. A grid structure for a nuclear reactor fuel assembly containing a plurality of elongated fuel elements each having a longitudinal axis and arranged in a generally parallel array with provision for a coolant flow along said elements, said grid structure comprising intersecting cross members intersecting at, and defining, cross member intersections and forming openings through which the fuel elements are adapted to extend and through which coolant flow in the reactor may pass, flow twisters integral with said grid structure at said intersections of said intersecting cross members and extending outwardly therefrom to a free end in a direction generally parallel to the longitudinal axis of said fuel elements, each twister comprising at least one tab having four outwardly extending arms with surfaces substantially extending from said cross member intersection to said free end, said tab having a cruciform cross section with a longitudinal centerline substantially parallel with the longitudinal axis of said fuel elements and being twisted about said longitudinal centerline to provide a plurality of spiral flow directing surfaces.

2. A grid as claimed in claim 1 in which said arms of said tab match the grid cross members of said cross member intersections with said arms connected at one end along said grid cross members to provide rigid support and the other end of the twister is free.

3. A grid as claimed in claim 1 in which the twister comprises a plurality of flow guiding surfaces spiraling along and around said twister centerline with one edge of said surfaces located at said centerline and forming an inner edge and with said surfaces extending radially outward from said centerline and terminating at a surface outer edge and extending transversely of adjacent twister surfaces.

4. A grid as claimed in claim 1 in which the twister is formed of two intersecting tabs with one tab integral with one cross member and the other tab integral with the other cross member.

5. A fuel assembly for a nuclear reactor comprising a plurality of elongated fuel elements disposed in a generally parallel spaced array and forming a plurality of longitudinal coolant flow channels between adjacent fuel elements, a plurality of spaced grids disposed in longitudinally spaced relationship along the said fuel elements and extending laterally thereof, each grid comprising intersecting cross members forming passageways through the grid through which passageways said fuel elements extend, said cross members intersecting, and defining cross member intersections, in said flow channels, means for supporting said fuel elements and said grid structures, flow directing tabs of cruciform cross section positioned at said intersections with each tab having a longitudinal central axis extending outwardly from, and in alignment with, a respective cross member intersection and parallel to said elements, said tabs each having four outwardly extending arms with longitudinal surfaces substantially extending along the longitudinal length of said tabs, said tabs each spiraling along and around said axis, each tab including a helical flow directing portion and each of said tabs having one end integral with at least one grid cross member at a respective cross member intersection and a free end spaced from each adjacent fuel element.

6. The fuel assembly as claimed in claim 5 in which said tab is made of two intersecting helical members intersecting along said axis with one helical member secured to one said cross member and the other helical member secured to the other cross member.

7. The fuel assembly as claimed in claim 6 in which one helical member is integral with one cross member and the other helical member is integral with the other cross member.

8. A grid for spacing fuel elements in a nuclear reactor comprising one set of spaced parallel cross members arranged on edge and having fuel element spacing means, a second set of spaced parallel cross members arranged on edge also having fuel element spacing means and arranged transversely of, intersecting, and defining cross member intersections with, said one set of members, tabs integral with said cross members and extending outwardly from said grid at respective cross member intersections, the tabs of one set slotted to receive the cross members and tabs of the second set, each tab having a longitudinal central axis and spiraling along and around said axis, said axis concentric with the respective cross member intersection.

9. A grid for spacing parallel fuel elements each having a longitudinal axis in a nuclear reactor comprising one set of spaced parallel cross members arranged on edge and including fuel element spacing means, a second set of spaced parallel cross members including fuel element spacing means and arranged on edge transversely of and intersecting, and defining cross member intersections with, said one set of members; a longitudinally extending tab of cruciform cross section having four outwardly extending arms with longitudinal surfaces substantially extending along the longitudinal length of said tab, having a longitudinal central axis and connected at one end to said members at a respective cross member intersection with said arms of said tab aligned with the intersecting members at the respective intersection and connected along the edges of said members, said tab extending outwardly from said grid in a direction generally parallel to the longitudinal axis of the fuel elements, said tab spiraling along and around said central axis of said tab, said axis aligned with said respective intersection, said arms and the connection to both said members providing a rigid self-supporting spiral tab.

* * * * *

UNITED STATES PATENT OFFICE
CERTIFICATE OF CORRECTION

PATENT NO. : 3,847,736
DATED : November 12, 1974
INVENTOR(S) : Frank Bevilacqua

It is certified that error appears in the above-identified patent and that said Letters Patent are hereby corrected as shown below:

In the Abstract, line 8, "an" should be --and--

Column 1, line 62, "abovementioned" should be --above mentioned--

Column 4, line 14, cancel "to"
        line 15, insert --to-- after "twister"
        line 18, "arms" should be --and--
        line 56, add a period (.) after "26"

Column 6, line 8 of Claim 9, change the semi-colon (;) to a comma (,)
        line 12 of Claim 9, insert --said tab-- before "having"

Signed and Sealed this fifteenth Day of June 1976

[SEAL]

Attest:

RUTH C. MASON
Attesting Officer

C. MARSHALL DANN
Commissioner of Patents and Trademarks